United States Patent [19]

Spaman et al.

[11] 4,095,146
[45] June 13, 1978

[54] REEL-TO-REEL DRIVE WITH SPEED CONTROL

[75] Inventors: Donald R. Spaman; David C. Schilke, both of Middletown, Conn.

[73] Assignee: Raymond Engineering Inc., Middletown, Conn.

[21] Appl. No.: 685,077

[22] Filed: May 10, 1976

[51] Int. Cl.² ............................................. H02P 5/46
[52] U.S. Cl. ........................................ 318/7; 318/72; 318/78
[58] Field of Search ................... 318/7, 72, 6, 70, 71, 318/77, 78

[56] References Cited

U.S. PATENT DOCUMENTS

| 3,644,806 | 2/1972 | Belson et al. | 318/72 X |
| 3,704,401 | 11/1972 | Miller | 318/72 X |
| 3,733,529 | 5/1973 | Ross et al. | 318/7 |
| 3,913,866 | 10/1975 | Hankins | 318/7 X |

Primary Examiner—B. Dobeck

[57] ABSTRACT

Long and short term variations in the speed at which a magnetic tape is moved with respect to a read and/or write head are minimized by maintaining the product of the speed of the tape payout and take-up reels constant. In accordance with a preferred embodiment the rotational speed of the payout reel and the rotational speed of the take-up reel are sensed and effectively multiplied to derive a signal which is compared with a predetermined constant magnitude reference signal. The result of the comparison is an error voltage which is employed to energize and thus control the speed of the drive motor for the take-up reel.

18 Claims, 2 Drawing Figures

REEL-TO-REEL DRIVE WITH SPEED CONTROL

BACKGROUND OF THE INVENTION

1. Field of the Invention

The present invention relates to minimizing variations in the speed of a magnetic tape being drawn, from a payout reel to a take-up reel, past a pickup and/or recording head. More particularly, the invention is directed to tape transports, and especially tape transports of the type which receive magnetic tape cassettes, having an automatic control which maintains, within predetermined limits, a constant linear tape speed intermediate the payout and take-up reels. Accordingly, the general objects of the present invention are to provide novel and improved methods and apparatus of such character.

2. Description of the Prior Art

While not limited thereto in its utility, the present invention has been found to be particularly well suited for use in cassette recorders intended for employment as digital magnetic memories in data processing apparatus such as, for example, the recently introduced family of apparatus known in the art as microprocessors. Due to the manner of use, and particularly because a cassette recorder employed as a digital magnetic memory will customarily be started, stopped and reversed with a high degree of frequency, reel-to-reel drives are favored over capstan and pinch roller drives in data processing applications. Belts, pulleys, solenoids, and other components subject to deterioration in use, as are employed in capstan type drives, are not required in reel-to-reel drives and control of the movements of the tape can be accomplished electronically by exercising control over the voltage applied to a drive motor in reel-to-reel drives.

In the interest of maximizing the data capacity of magnetic tape cassettes employed as digital magnetic memories, long term speed variations of the tape at the read and/or write head must be minimized. As is well known, as the tape is fed from the payout or supply reel to the take-up reel of a cassette its linear speed will tend to vary. This variation in linear tape speed results from the decreasing angular velocity of the take-up reel as the tape is wound thereon and the simultaneous continual increase in the angular velocity of the payout reel as its effective diameter decreases. Long term speed variation, in part, determines the data capacity of the cassette and, for digital applications, must be controlled to be within ± 5%.

The tape is also subject to short term speed variations or "flutter" such as, for example, caused by irregularities on the tape drive motor pulley and belt or on the tape reels themselves. These short term speed variations, which determine the bit error rate, must also be held within predetermined limits. It is to be noted that the short term speed variations are superimposed on the long term speed variations. A speed control technique, to be effective for digital systems, must take into account this inherent summation of the short and long term speed variations.

A number of techniques have been proposed for effecting tape drive speed control in tape transports designed for digital applications. A summary of the state of the art, and a brief discussion of the deficiencies thereof, may be found in U.S. Pat. No. 3,733,529. U.S. Pat. No. 3,733,529 is exemplary of previous attempts to overcome the deficiencies inherent in the use of either capstan type drives or prerecorded clock tracks to achieve constant linear tape velocity. Approaches such as that exemplified by U.S. Pat. No. 3,733,529 are characterized by complexity from an implementation viewpoint and, as is well known, circuit complexities increase cost and have a deleterious effect upon reliability.

SUMMARY OF THE INVENTION

The present invention overcomes the above briefly discussed and other deficiencies and disadvantages of the prior art by providing a novel and improved technique for maintaining, within predetermined limits, a constant linear speed of a magnetic tape being drawn from a supply reel to a pickup reel. The novel apparatus for practicing the technique of the present invention is characterized by reliability and comparatively modest cost.

In accordance with the invention, the product of the angular speed of the payout or supply reel and that of the take-up reel of a reel-to-reel tape transport is maintained constant through adjustment of the speed of the drive motor for the take-up reel. The invention employs apparatus for sensing the angular speed of both the payout and take-up reels and generating signals commensurate with the sensed speeds. The signals are multiplied and the product is compared with a preselected constant reference voltage. The error signal resulting from this comparison, which is a DC voltage level modulated commensurate with deviations from the desired linear tape speed, is employed as the supply voltage for the take-up reel drive motor and thus the speed of the drive motor will be varied as a function of the error signal to maintain the linear speed of the tape intermediate the payout and take-up reels at a predetermined constant velocity.

BRIEF DESCRIPTION OF THE DRAWING

The present invention may be better understood and its numerous objects and advantages will become apparent to those skilled in the art by reference to the accompanying drawing wherein like reference numerals refer to like elements in the two figures and in which.

DESCRIPTION OF THE PREFERRED EMBODIMENT

Figure 1:
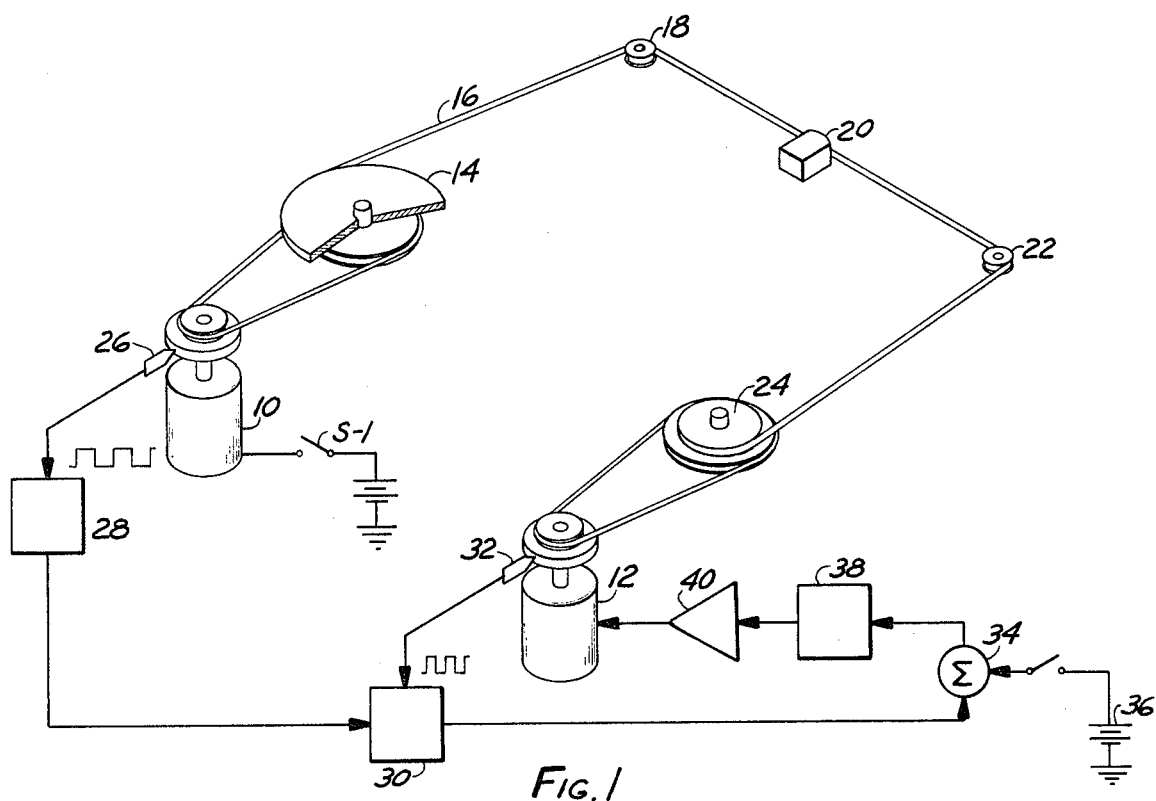
FIG. 1 is a schematic representation of a tape transport in accordance with the present invention.

With reference now to the drawing, and particularly to FIG. 1, a tape transport in accordance with the present invention will include at least a pair of drive motors 10 and 12. The drive motors will typically be direct current motors. Drive motor 10 is coupled, via a conventional belt drive including a belt and pair of pulleys, to a payout or supply reel 14. Payout reel 14 will typically be included as part of a cassette received on the tape transport. A magnetic tape 16, which in the example being described will have a computer program in digital form stored thereon, will initially be wound on reel 14. The tape 16 from payout reel 14 will extend over an idler wheel 18, will traverse the surface of a read and/or write head 20, will pass over a second idler wheel 22 and will be wound on a take-up reel 24. For the reasons set forth above in the discussion of the prior art, it is necessary to control the linear speed of tape 16 as it passes head 20 to minimize "flutter" and also to minimize long term speed variations resulting from the change in angular velocity of the payout and take-up reels as the tape is transferred from the former to the latter.

When the tape 16 is being "read", drive motor 10 will typically be deenergized and thus this motor will function merely to brake the payout reel 14. It may, however, in some circumstances be considered desirable to apply a constant current to motor 10 during such a "read" mode to enhance the braking effect. The application of a constant current to motor 10 for braking purposes may be via a switch S-1. Motor 10 will, of course, be energized from a voltage source, not shown, for rewinding the tape.

The angular speeds of reels 14 and 24 are sensed and signals commensurate therewith generated. In FIG. 1 the means for sensing the angular speed of payout reel 14 comprises a tachometer, indicated schematically at 26, operatively coupled to the output shaft of motor 10. In one reduction to practice of the invention tachometer 26 comprised a variable reluctance type device. The output signal from tachometer 26 is delivered to signal processing circuitry 28 which will be described below in the discussion of FIG. 2. Signal processing circuitry 28 will provide an output signal, typically in the form of a DC voltage level, to a multiplication circuit 30. The means for sensing the speed of take-up reel 24 will comprise a tachometer, indicated schematically at 32, which may be identical to tachometer 26. The output of tachometer 32, typically in the form of a square wave signal, is delivered to multiplier 30.

Multiplier 30 provides, at its output, a signal commensurate with the product of the output signals from tachometers 26 and 32. This multiplier output signal, which corresponds to the product of the speeds of payout reel 14 and take-up reel 24, is delivered to a comparator circuit 34. Comparator circuit 34 may, in its least complicated form, comprise merely a summing circuit wherein the signal from multiplier 30 is algebraically added to a preselected bias voltage as provided by a bias voltage source 36. Bias voltage source 36 will provide a DC voltage which, when summed with a DC potential equivalent to the output of multiplier 30, will be commensurate with the speed of drive motor 12 required to achieve the desired tape speed at head 20.

The "error" voltage from comparator 34 is delivered, via a compensation network 38, to a power amplifier 40. The compensation network 38 will typically comprise a lag-lead network included to prevent hunting of drive motor 12. The output of power amplifier 40, the magnitude of which controls the speed of drive motor 12, is delivered directly to the motor.

Figure 2:
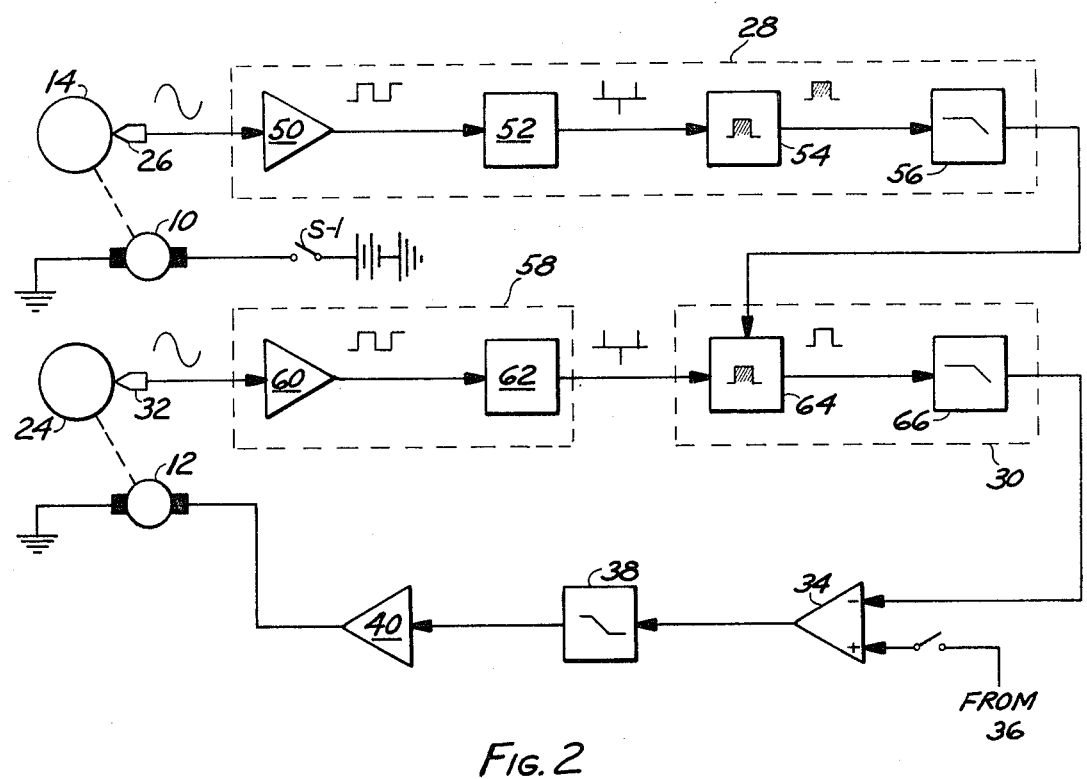
FIG. 2 is a functional block diagram of the motor speed control circuit of the tape transport of FIG. 1.

Referring to FIG. 2, the control circuitry of FIG. 1 is depicted in functional block diagram form. The tachometers 26 and 32, respectively associated with payout reel 14 and take-up reel 24 are, as noted above, preferably variable reluctance devices. It has been found, in practice, that the sensing of the speeds of the payout and take-up reels can most easily be accomplished by affixing, to the output shafts of motors 10 and 12, gears with ferromagnetic teeth. The pickup coils for the tachometers are positioned in proximity to these gears and, as the reels and thus the motor shafts rotate, voltages approximating a sine wave will be induced in the pickup coils.

The signal generated by tachometer 26 is delivered to the signal processing circuit 28. Circuit 28 includes an amplifier and squaring circuit 50, a differentiator 52, a single shot multivibrator 54 and a low pass filter 56. The amplifier and squaring circuit 50, which receives the tachometer signal, may comprise a circuit known in the art as a comparator with hysteresis. This circuit will consist of an amplifier and a Schmitt trigger which provides, at its output, a square wave commensurate with the tachometer generated signal. This square wave is differentiated in circuit 52 to provide a series of pulses which are delivered as the input signals to the multivibrator 54. Multivibrator 54 will provide output pulses having a fixed period and a repetition rate commensurate with the speed of payout reel 14. The pulses from multivibrator 54 are delivered to low pass filter 56 which provides, at its output terminal, a DC voltage having a magnitude which varies in accordance with the repetition rate of the pulses from multivibrator 54 and thus with the speed of payout reel 14. Filter 56 may comprise an operational amplifier with capacitive feedback.

The output signal provided by tachometer 32 is delivered to a signal processing circuit 58 comprising an amplifier and squaring circuit 60 and a differentiator 62. Circuits 60 and 62 may respectively be identical to the amplifier and squaring circuit 50 and differentiator 52 of signal processing circuit 28 and will perform the same functions. The output of differentiator 62 of signal processing circuit 58 is delivered as a first input to a monostable multivibrator 64. The second input to multivibrator 64 is the DC signal appearing at the output of filter 56 and commensurate with the speed of payout reel 14. Multivibrator 64 will provide output pulses synchronized with the output of differentiator 62 and having a width determined by the magnitude of the DC output voltage from filter 56. Accordingly, the output of multivibrator 64, in the manner known in the art, will be commensurate with the product of the output signals provided by tachometers 26 and 32 and this signal will in turn be commensurate with the product of the speeds of payout reel 14 and take-up reel 24. The pulses provided by multivibrator 64 are delivered to a further low pass filter 66. Filter 66, which may be identical to filter 56, will provide a DC output voltage having a magnitude which varies with variations in the product of the speeds of the payout and take-up reels.

The voltage from filter 66 is supplied as the first input to the summing amplifier 34 which functions as the comparator. Typically, the preselected bias voltage from source 36 will be applied to the positive input of summing amplifier 34 while the output of filter 66 will be applied to the negative input of amplifier 34. An "error" voltage consisting of the bias voltage as modulated by the product of the payout and take-up reel speeds will thus appear at the output of amplifier 34. This "error" signal is subjected to servo-loop compensation in a filter network 38 which, as noted above, may be merely a lag-lead network. In actual practice, the servo-loop compensation may be accomplished by a feedback circuit connected between the output and negative input terminals to summing amplifier 34. The compensated "error" voltage is delivered, via power amplifier 40, to the take-up reel drive motor 12.

To summarize, in accordance with the present invention variations in the speed of the tape on a reel-to-reel tape transport are maintained within predetermined limits by keeping the product of the payout and take-up reel motor speeds equal to a constant. The invention has the attributes of holding long term speed variations below 3% thus achieving substantially constant tape speed. The invention also results in greatly reduced flutter; i.e., short term speed variations. The present invention has also been found to have greater immunity to temperature variations when compared to the prior art. Bearing in mind that the sum of the long and short term speed variations determines the applicability of a tape drive to digital systems, it will be obvious to those skilled in the art that the present invention constitutes a significant step forward from the standpoint of the degree of control achieved and, in addition, with respect to both the initial cost and reliability of a tape drive.

While a preferred embodiment has been shown and described, various modifications and substitutions may be made thereto without departing from the spirit and scope of the invention. Thus, by way of example, while the invention has been described in the context of a pulse width modulation scheme, it will be understood that pulse amplitude modulation can also be employed to accomplish the multiplication of the tape reel speeds. Also, the invention is applicable to a tape transport wherein the tape is scanned in both directions as opposed to being completely rewound each time new instructions are to be read. Accordingly, it will be understood that the present invention has been described by way of illustration and not limitation.

What is claimed is:

1. A method for minimizing the linear speed variations of a strip being drawn off a supply reel and delivered to a take-up reel comprising the steps of:
   sensing the speed of the supply reel;
   sensing the speed of the take-up reel;
   determining the product of the speeds of the supply and take-up reels; and
   varying the speed of the take-up reel to maintain the product of the speeds of the supply and take-up reels constant whereby the linear speed of the strip will be maintained approximately constant.

2. The method of claim 1 wherein the step of varying the speed of the take-up reel comprises:
   modulating the applied voltage for a take-up reel drive motor.

3. The method of claim 2 wherein the step of modulating the take-up reel drive motor supply voltage further comprises:
   calculating the sum of a predetermined constant and the product of the supply and take-up reel speeds; and
   adjusting the take-up reel motor supply voltage in accordance with the thus calculated sum.

4. In a reel-to-reel tape transport, said transport including at least a first drive motor for a take-up reel, said transport receiving a tape system including a magnetic tape extending between supply and take-up reels, the improvement comprising:
   means for sensing the speed of the supply reel and generating a signal commensurate therewith;
   means for sensing the speed of the take-up reel and generating a signal commensurate therewith;
   multiplier means responsive to said signals commensurate with speed for producing an output signal corresponding to the product of the reel speeds;
   means generating a reference voltage;
   modulator means responsive to said reference voltage and to said signal commensurate with the product of the reel speeds for providing a speed control voltage which varies in accordance with variations in the product of the reel speeds; and
   means delivering said speed control voltage provided by said modulator means as the energizing voltage for said first drive motor whereby the speed of said take-up reel will be adjusted to maintain the product of the reel speeds constant to thereby minimize variations in linear speed of the tape being transferred from the supply to the take-up reel.

5. The apparatus of claim 4 wherein said means for sensing the speed of said supply and take-up reels each includes:
   a tachometer, said tachometer providing an alternating output voltage having a frequency commensurate with reel speed; and
   means responsive to the alternating voltage provided by said tachometer for generating a train of pulses having a repetition rate commensurate with reel speed.

6. The apparatus of claim 5 wherein said means for sensing the speed of one of said reels further comprises:
   means for generating a DC voltage having a magnitude commensurate with the repetition rate of the pulse train commensurate with the speed of the said reel.

7. The apparatus of claim 6 wherein said multiplier means comprises:
   means responsive to said DC voltage commensurate with the speed of said one of the reels and to the pulse train having a pulse repetition rate commensurate with the speed of the other of the reels for providing a further train of pulses synchronized with the input pulses to said multiplier means and modulated in accordance with said DC input voltage to said multiplier means; and
   first filter means responsive to said further pulse train for generating a DC voltage commensurate therewith.

8. The apparatus of claim 4 wherein said tape transport includes drive motors for both of said reels and wherein said speed sensing means respectively monitor the speed of the output shafts of the supply and take-up reel drive motors.

9. The apparatus of claim 8 wherein said means for sensing the speed of said supply and take-up reels each includes:
   a variable reluctance tachometer, said tachometer generating an alternating output signal having a frequency commensurate with the speed of the drive motor output shaft; and
   means responsive to the alternating voltage provided by said tachometer for generating a train of pulses having a repetition rate commensurate with reel speed.

10. The apparatus of claim 9 wherein said means for sensing the speed of one of said reels further comprises:
    means for generating a DC voltage having a magnitude commensurate with the repetition rate of the pulse train commensurate with the speed of the said reel.

11. The apparatus of claim 10 wherein said multiplier means comprises:
    means responsive to said DC voltage commensurate with the speed of said one of the reels and to the pulse train having a pulse repetition rate commensurate with the speed of the other of the reels for providing a further train of pulses synchronized with the input pulses to said multiplier means and modulated in accordance with said DC input voltage to said multiplier means; and first filter means responsive to said further pulse train for generating a DC voltage commensurate therewith.

12. The apparatus of claim 11 wherein said modulator means comprises:
summing means, said summing means being responsive to said reference voltage and to the DC voltage provided by said first filter means for providing a variable DC output voltage having a magnitude commensurate with the take-up reel drive motor speed necessary to maintain the product of the supply and take-up reel speeds constant.

13. The apparatus of claim 4 wherein said modulator means comprises:
summing means, said summing means being responsive to said reference voltage and to the multiplier means output signal for providing a variable DC output voltage having a magnitude commensurate with the take-up reel drive motor speed necessary to maintain the product of the supply and take-up reel speeds constant.

14. Apparatus for minimizing linear speed variations of a strip of material being drawn from a supply reel and delivered to a take-up reel comprising:
means for sensing the speed of the supply reel and generating a signal commensurate therewith;
means for sensing the speed of the take-up reel and generating a signal commensurate therewith;
means multiplying said signals commensurate with reel speed to produce an output signal corresponding to the product of the reel speeds;
means generating a reference voltage;
means responsive to said reference voltage and to said signal corresponding to the product of reel speeds for modulating said reference voltage in accordance with variations in said product; and
means responsive to said modulated reference voltage for adjusting the speed of the take-up reel to maintain the product of the supply and take-up reel speeds constant whereby the linear speed of the strip of material will be maintained approximately constant.

15. In a reel-to-reel tape transport, said transport including a first drive motor for a take-up reel and a second drive motor for a supply reel, said transport receiving a tape system including a magnetic tape extending between supply and take-up reels, the improvement comprising:
first means for sensing the speed of the supply reel by monitoring the speed of the supply reel drive motor and generating a signal commensurate therewith;
second means for sensing the speed of the take-up reel by monitoring the speed of the take-up reel drive motor and generating a signal commensurate therewith;
said first and second means for sensing the speed of said supply and take-up reels each including:
a variable reluctance tachometer, said tachometer generating an alternating output signal having a frequency commensurate with the speed of the drive motor output shaft; and
means responsive to the alternating signal provided by said tachometer for generating a train of pulses having a repetition rate commensurate with reel speed;
means for generating a DC voltage having a magnitude commensurate with the repetition rate of the pulse train commensurate with the speed of one of said reels, said DC voltage generating means comprising:
multivibrator means, said multivibrator means being responsive to input pulses for producing a square wave signal having a constant magnitude and a repetition rate commensurate with the period of the input pulse train; and
first filter means responsive to the square wave provided by said multivibrator means for providing a DC output voltage;
multiplier means responsive to said signals commensurate with speed for producing an output signal corresponding to the product of the reel speeds, said multiplier means comprising:
means responsive to said DC voltage commensurate with the speed of said one of the reels and to the pulse train having a pulse repetition rate commensurate with the speed of the other of the reels for providing a further train of pulses synchronized with the input pulses to said multiplier means and modulated in accordance with said DC input voltage to said multiplier means; and
second filter means responsive to said further pulse train for generating a DC voltage commensurate therewith; means generating a reference voltage;
modulator means responsive to said reference voltage and to said signal commensurate with the product of the reel speeds for providing a speed control voltage which varies in accordance with variations in the product of the reel speeds, said modulator means comprising:
summing means responsive to said reference voltage and to the DC voltage provided by said second filter means for providing a variable DC output voltage having a magnitude commensurate with the take-up reel drive motor speed necessary to maintain the product of the supply and take-up reel speeds constant; and
means delivering said speed control voltage provided by said modulator means as the energizing voltage for said first drive motor whereby the speed of said take-up reel will be adjusted to maintain the product of the reel speeds constant to thereby minimize variations in linear speed of the tape being transferred from the supply to the take-up reel.

16. The apparatus of claim 15 wherein said means generating said further pulse train comprises:
variable pulse generator means, said pulse generator means receiving the DC voltage from said first filter means and the pulse train having a repetition rate commensurate with the speed of the other of the said reels.

17. In a reel-to-reel tape transport, said transport including a first drive motor for a take-up reel and a second drive motor for a supply reel, said transport receiving a tape system including a magnetic tape extending between supply and take-up reels, the improvement comprising:
first means for sensing the speed of the supply reel by monitoring the speed of the supply reel drive motor and generating a signal commensurate therewith;
second means for sensing the speed of the take-up reel by monitoring the speed of the take-up reel drive motor and generating a signal commensurate therewith;

said first and second means for sensing the speed of said supply and take up reels each including means for generating a train of pulses having a repetition rate commensurate with reel speed;

means for generating a DC voltage having a magnitude commensurate with the repetition rate of the pulse train commensurate with the speed of one of said reels, said DC voltage generating means comprising:

multivibrator means, said multivibrator means being responsive to input pulses for producing a square wave signal having a constant magnitude and a repetition rate commensurate with the period of the input pulse train; and first filter means responsive to the square wave provided by said multivibrator means for providing a DC output voltage;

multiplier means responsive to said signals commensurate with speed for producing an output signal corresponding to the product of the reel speeds, said multiplier means comprising:

means responsive to said DC voltage commensurate with the speed of said one of the reels and to the pulse train having a pulse repetition rate commensurate with the speed of the other of the reels for providing a further train of pulses synchronized with the input to said multiplier means and modulated in accordance with said DC input voltage to said multiplier means; and second filter means responsive to said further pulse train for generating a DC voltage commensurate therewith; means generating a reference voltage;

modulator means responsive to said reference voltage and to said signal commensurate with the product of the reel speeds for providing a speed control voltage which varies in accordance with variations in the product of the reel speeds, said modulator means comprising:

summing means responsive to said reference voltage and to the DC voltage provided by said second filter means for providing a variable DC output voltage having a magnitude commensurate with the take-up reel drive motor speed necessary to maintain the product of the supply and take-up reel speeds constant; and means delivering said speed control voltage provided by said modulator means as the energizing voltage for said first drive motor whereby the speed of said take-up reel will be adjusted to maintain the product of the reel speeds constant to thereby minimize variations in linear speed of the tape being transferred from the supply to the take-up reel.

18. The apparatus of claim 17 wherein said means generating said further pulse train comprises:

variable pulse generator means, said pulse generator means receiving the DC voltage from said first filter means and the pulse train having a repetition rate commensurate with the speed of the other of the said reels.

* * * * *